United States Patent [19]

Self

[11] Patent Number: 4,767,089
[45] Date of Patent: Aug. 30, 1988

[54] VESSEL STABILIZER

[76] Inventor: Carlin S. Self, 1164 Profanity La., Redding, Calif. 96003

[21] Appl. No.: 33,728

[22] Filed: Apr. 3, 1987

[51] Int. Cl.[4] .............................................. A47G 23/02
[52] U.S. Cl. .................................... 248/152; 248/154; 248/174
[58] Field of Search ............... 248/152, 174, 146, 150, 248/154; 206/45.14, 460; 211/72, 73, 85

[56] References Cited

U.S. PATENT DOCUMENTS

| | | | |
|---|---|---|---|
| 1,026,780 | 5/1912 | Asheim | 248/152 X |
| 2,264,489 | 12/1941 | Tiegler et al. | 248/152 |
| 2,454,877 | 11/1948 | Lewis | 248/174 X |
| 2,876,114 | 3/1959 | Robertson et al. | 248/174 X |
| 2,889,127 | 6/1959 | Rossi | 211/73 X |
| 3,297,289 | 1/1967 | Ravs | 248/152 |
| 3,488,022 | 1/1970 | Vittori | 248/152 |
| 3,881,674 | 5/1975 | Greene | 248/152 |
| 4,102,488 | 7/1978 | Morrow et al. | 211/73 X |

Primary Examiner—J. Franklin Foss
Attorney, Agent, or Firm—Leonard D. Schappert

[57] ABSTRACT

A vessel stabilizer is provided which is constructed of a thin sheet of structural material folded to create a base and at least two flaps so that, when a vessel is positioned on the base and secured to the flaps, the vessel remains substantially stable during transport thereof.

2 Claims, 1 Drawing Sheet

VESSEL STABILIZER

BACKGROUND OF THE INVENTION

1. Field of the Invention

The present invention relates generally to devices known as vessel stabilizers, and more specifically to vessel stabilizers designed to be utilized with a multiplicity of different types of vessels and to hold such vessels upright during transport.

2. Description of the Prior Art

In attempting to produce effective vessel stabilizers, inventors in the past have utilized various designs generally constructed of a base of cardboard or other relatively lightweight material having an area cut out therefrom of the proper size to allow the base of a vessel to be inserted therein. Others have utilized sheets of material with multiple cuts designed to allow tne sheet of material to conform to the outer shape of the vessel to be stabilized without requiring attachment thereto. One such vessel stabilizer is a bottle support, U.S. Pat. No. 2,264,489, issued in 1941 to Tiegler et al, which consists of a sheet of rubber having multiple parallel fingers cut therein to facilitate the placement of a bottle therein, the rubber retaining sufficient resiliency to hold the bottle in place by friction. None of the prior art of which applicant is aware has taught a vessel stabilizer having the unique structure and features taught by the present invention.

SUMMARY OF THE INVENTION

The present invention consists of a vessel stabilizer constructed generally of a sheet of material having at least two folds forming a base and at least two substantially upright members. The edges of such upright members are designed to be attached to a vessel which is set on the base, thereby providing a substantially stable base for positioning in a moving vehicle during transportation of the vessel. When utilized for carrying floral arrangements in vases, the vessel stabilizer is especially desirable for stabilizing the vase while sitting on an automobile seat.

One of the objects of the present invention is to provide an inexpensive, lightweight and effective vessel stabilizer for use with vases, cups, glasses and a multitude of other oddly-shaped vessels.

Another object of the present invention is to provide a vessel stabilizer which is simple in construction so as to minimize manufacturing costs and increase the ease of utilization.

A further object of the present invention is to provide a vessel stabilizer which, because of its unique construction, is usable without modification with vessels of a multiplicity of sizes and shapes.

Another object of the present invention is to provide a vessel stabilizer which may be inexpensively produced utilizing recyclable materials, thereby creating a disposable vessel stabilizer.

The foregoing objects, as well as other objects and benefits of the present invention, are made more apparent by the descriptions and claims which follow.

DESCRIPTION OF THE PREFERRED EMBODIMENT

Figure 1:
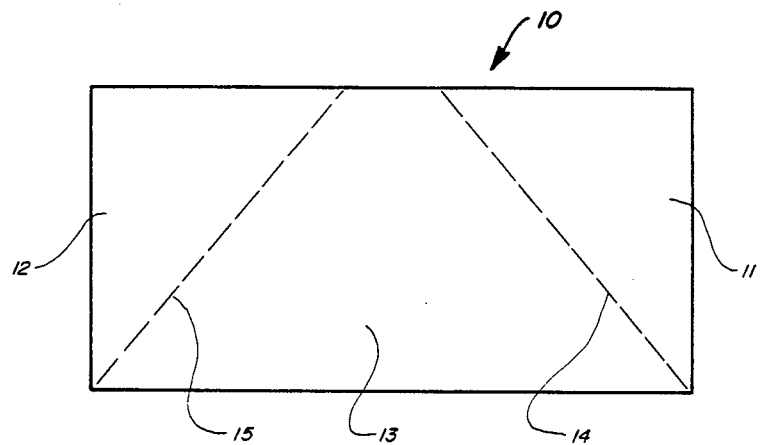
FIG. 1 of the drawings is a top view of the vessel stabilize in an unfolded condition showing the position of the folds utilized in assembling the vessel stabilizer.

FIG. 1 is a top view of a vessel stabilizer 10 constructed of a relatively thin sheet of material designed to be folded to establish a base upon which a vessel is set and ends which are attached to the sides of the vessel to be stabilized. More specifically, vessel stabilizer 10 is constructed generally of a thin sheet of material such as relatively thick paper or relatively thin, flexible cardboard, or any other sufficiently strong, flexible material. The sheet of structural material utilized in creating vessel stabilizer 10 is here shown as substantially rectangular, but could be constructed with any other geometric shape which would allow the use as a vessel stabilizer in the manner taught herein. Vessel stabilizer 10 is designed to be folded along lines 14 and 15 to create a base 13 upon which a vessel is positioned, and to create two flaps 11 and 12 as a result of being folded along lines 14 and 15.

Figure 2:
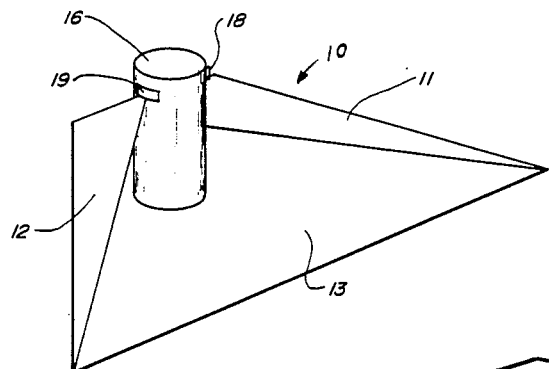
FIG. 2 is a perspective view of the vessel stabilizer with a vessel to be stabilized positioned thereon and with the vessel stabilizer attached thereto.

FIG. 2 of the drawings shows vessel stabilizer 10 of FIG. 1 in position to stabilize vessel 16 positioned thereon. Vessel 16 is positioned on base 13 of vessel stabilizer 10. Flaps 11 and 12 extend upward to rest against the sides of vessel 16 and attach thereto by attaching means 18 and 19, thereby holding vessel 16 substantially stable on base 13 of vessel stabilizer 10. Attaching means 18 and 19 are generally constructed of adhesive tape.

Figure 3:
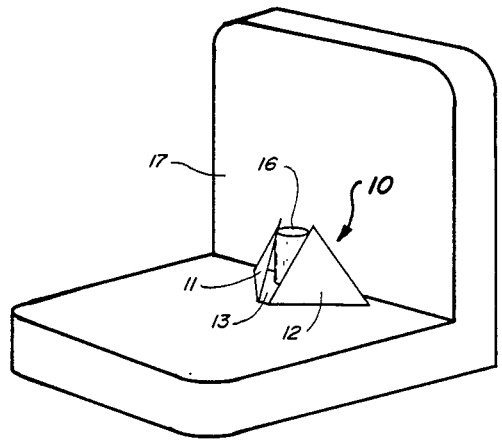
FIG. 3 is a perspective view of the vessel stabilizer in use stabilizing a vessel on a car seat.

FIG. 3 shows vessel stabilizer 10 in use stabilizing a vessel being transported. During transportation of a vessel 16, vessel stabilizer 10 is generally positioned on car seat 17 or any other surface which is relatively stable with respect to the vehicle utilized for transport. So positioned, vessel 16 is held in a relatively stable upright position, and flaps 11 and 12 of vessel stabilizer 10 keep vessel 16 from sliding on base 13 and/or tipping over.

Vessel stabilizer 10 as taught herein is generally constructed of a sheet of structural material which may be folded to create a base 13 and flaps 11 and 12 to stabilize a vessel. However, vessel stabilizer 10 as here set out could also be constructed utilizing substantially rigid material preformed to create substantially rigid upright flaps 11 and 12 with respect to a substantially rigid base 13.

While the foregoing description of the invention has shown a preferred embodiment using specific terms, such description is presented for illustrative purposes only. It is applicant's intention that changes and variations may be made without departure from the spirit or scope of the following claims, and this disclosure is not intended to limit applicant's protection in any way.

I claim:

1. A vessel stabilizer for use in holding a vessel upright, comprising:
   a substantially horizontal base having:
   a front edge having a left end and a right end;
   a back edge less than one-half the length of said front edge offset from and positioned substantially parallel to said front edge and having a left end and a right end;

a left edge extending from said left end of said front edge to said left end of said back edge;

a right edge extending from said right end of said front edge to said right end of said back edge;

a left flap attached to and extending substantially upward from said left edge of said substantially horizonal base, and a right flap attached to and extending substantially upward from said right edge of said substantially horizontal base, so that said vessel is held in a substantially upright position when said vessel is positioned on said base and said flaps are secured to said vessel by an adhesive means.

2. The invention of claim 1, wherein said attaching means consist substantially of tape having adhesive thereon.

* * * * *